(12) United States Patent
Kim et al.

(10) Patent No.: US 11,435,247 B2
(45) Date of Patent: Sep. 6, 2022

(54) BRAKING ROBOT FOR BRAKING TEST OF VEHICLE

(71) Applicant: Autonomous A2Z, Gyeongsangbuk-do (KR)

(72) Inventors: Hyun Ho Kim, Gyeonggi-do (KR); Ji Hyeong Han, Daegu (KR)

(73) Assignee: AUTONOMOUS A2Z

( * ) Notice: Subject to any disclaimer, the term of this patent is extended or adjusted under 35 U.S.C. 154(b) by 0 days.

(21) Appl. No.: 17/104,110

(22) Filed: Nov. 25, 2020

(65) Prior Publication Data

US 2022/0113207 A1    Apr. 14, 2022

(51) Int. Cl.
| | |
|---|---|
| *G01L 5/28* | (2006.01) |
| *B25J 9/10* | (2006.01) |
| *B25J 9/16* | (2006.01) |
| *B25J 13/08* | (2006.01) |

(52) U.S. Cl.
CPC ............. *G01L 5/28* (2013.01); *B25J 9/1035* (2013.01); *B25J 9/1633* (2013.01); *B25J 9/1692* (2013.01); *B25J 13/085* (2013.01)

(58) Field of Classification Search
CPC ................................. B25J 9/1035; G01L 5/28
USPC .......................................................... 73/132
See application file for complete search history.

(56) References Cited

U.S. PATENT DOCUMENTS

| | | | | | |
|---|---|---|---|---|---|
| 3,662,593 | A | * | 5/1972 | Pirrello | G01L 5/225 74/482 |
| 3,977,241 | A | * | 8/1976 | Asmus | G01L 5/225 73/132 |
| 5,168,750 | A | * | 12/1992 | Kurtz | G01L 5/28 73/132 |
| 5,172,589 | A | * | 12/1992 | Witt | G01M 17/0074 901/50 |
| 5,483,825 | A | * | 1/1996 | Greenbaum | G01L 5/225 73/132 |
| 6,363,774 | B2 | * | 4/2002 | Duff | B60T 17/221 73/132 |
| 6,681,620 | B2 | * | 1/2004 | Sakamoto | G01N 19/02 73/132 |

(Continued)

FOREIGN PATENT DOCUMENTS

CN       111220390       6/2020

OTHER PUBLICATIONS

Corresponding EP Patent Appln. No. 20208943.9 Extended Search Report dated Jun. 14, 2021.

*Primary Examiner* — Eric S. McCall
(74) *Attorney, Agent, or Firm* — McCarter & English, LLP

(57) ABSTRACT

A braking robot for a braking test of a vehicle is provided. The braking robot includes: a plurality of motors, having same individual output powers, combined with a robot body installed in the vehicle; a motion shaft combined with a pedal presser for applying pedal effort to a brake pedal of the vehicle; a driving force converter which converts rotational forces of the motors, corresponding to the individual output powers of the motors, into a translational force and thus transmits the translational force to the motion shaft; a load sensor, installed on the motion shaft, for detecting the pedal effort applied to the brake pedal by the motion shaft; and a controller for controlling operations of the motors by referring to (1) a scenario for the braking test and (2) information on the pedal effort detected from the load sensor.

18 Claims, 11 Drawing Sheets

(56) References Cited

U.S. PATENT DOCUMENTS

| | | | | |
|---|---|---|---|---|
| 6,736,003 | B2* | 5/2004 | Takeda | G01N 19/02 |
| | | | | 73/132 |
| 7,313,951 | B2* | 1/2008 | Robinson | G01L 5/225 |
| | | | | 73/132 |
| 9,050,960 | B2* | 6/2015 | Neu | G05G 1/38 |
| 2005/0072222 | A1* | 4/2005 | Harrison | G01M 17/0074 |
| | | | | 73/132 |
| 2009/0056432 | A1* | 3/2009 | Steininger | G01L 5/28 |
| | | | | 73/132 |
| 2013/0205882 | A1* | 8/2013 | Neu | G05G 1/38 |
| | | | | 73/132 |

* cited by examiner

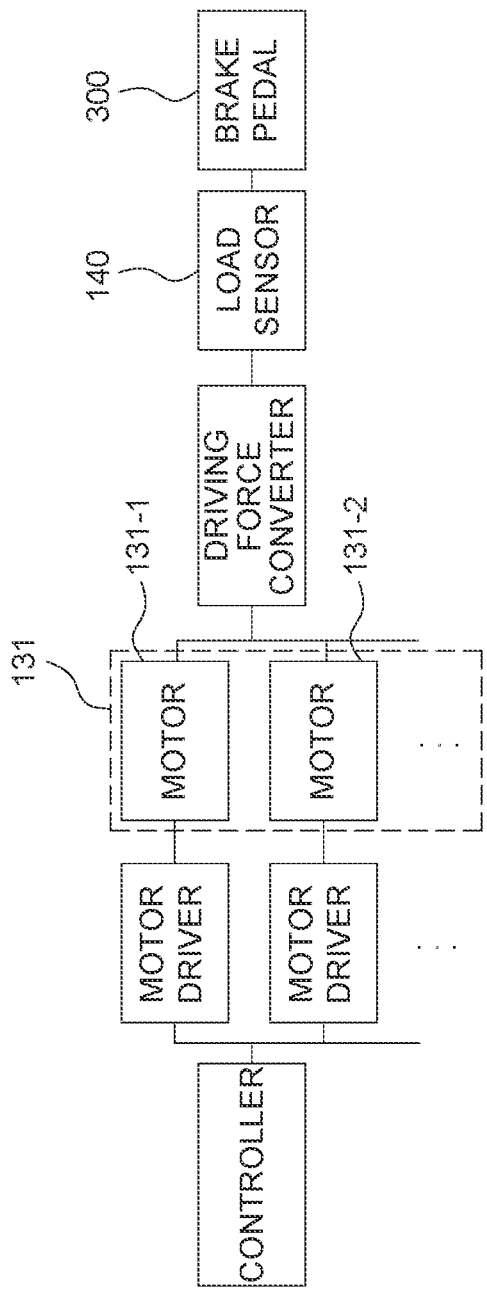

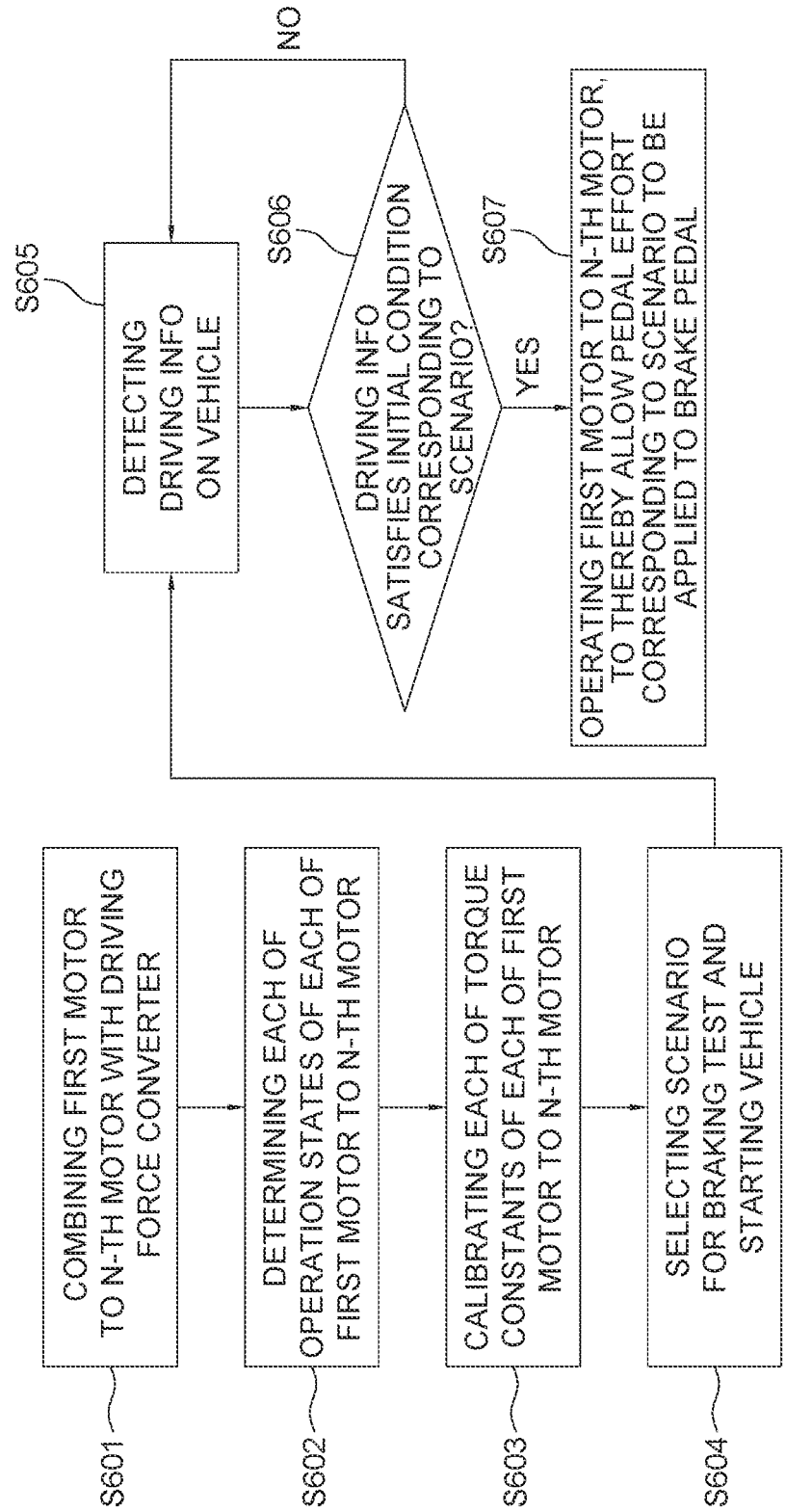

BRAKING ROBOT FOR BRAKING TEST OF VEHICLE

CROSS-REFERENCE TO RELATED APPLICATIONS

This application claims the benefit of Korean Patent Application No. KR 10-2020-0132271, filed Oct. 13, 2020, which is incorporated herein by reference in its entirety.

FIELD OF THE DISCLOSURE

The present disclosure relates to a braking robot for a braking test of a vehicle; and more particularly, to the braking robot comprised of a plurality of motors connected in parallel for applying force to a brake pedal of the vehicle.

BACKGROUND OF THE DISCLOSURE

To ensure a reliability in braking of a vehicle, automakers may conduct braking tests in harsh environments and extreme operating conditions at each stage of development.

Meanwhile, numerous braking tests are required due to different vehicle regulations and requirements for each country, and when an actual human test driver performs the braking tests, additional problems may occur due to fatigue and musculoskeletal disorders of the test driver, and non-uniformity of force applied to a brake pedal, etc.

Therefore, a robot for performing the braking test may be used to eliminate such additional problems.

However, the braking robot currently in use can take up to about four hours for installation even by two of adults. Also, a structure of the braking robot is rather complex to the extent of interfering with operation by the test driver, and the braking robot requires motors with various outputs for pedaling, depending on required pedal effort.

Due to these reasons, a braking robot with a simplified structure which generates various outputs using a plurality of single-output motors connected in parallel is required.

SUMMARY OF THE DISCLOSURE

It is an object of the present disclosure to solve all the aforementioned problems.

It is another object of the present disclosure to allow generation of various outputs by connecting a plurality of single-output motors in parallel.

It is still another object of the present disclosure to acquire operation states of the motors of a braking robot for a braking test while the braking robot is stationary.

It is still yet another object of the present disclosure to provide the braking robot which satisfies a condition corresponding to a scenario for the braking test.

In accordance with one aspect of the present disclosure, there is provided a braking robot for a braking test of a vehicle, including: a plurality of motors, having same individual output powers, combined with a robot body installed in the vehicle; a motion shaft combined with a pedal presser for applying pedal effort to a brake pedal of the vehicle; a driving force converter which converts rotational forces of the motors, corresponding to the individual output powers of the motors, into a translational force and thus transmits the translational force to the motion shaft; a load sensor, installed on the motion shaft, for detecting the pedal effort applied to the brake pedal by the motion shaft; and a controller for controlling operations of the motors by referring to (1) a scenario for the braking test and (2) information on the pedal effort detected from the load sensor.

As one example, the motors include a first motor to an n-th motor, wherein a sum of the individual output powers of the first motor to the n-th motor corresponds to the pedal effort predetermined for the braking test, and wherein n is an integer equal to or greater than 1, and wherein, before the braking test is performed, the controller (i) transmits a first control signal for instructing a k-th motor to rotate in a first rotational direction to the k-th motor and a second control signal for instructing a (k+1)-th motor to rotate in a second rotational direction to the (k+1)-th motor and (ii) acquires each of operation states of each of the k-th motor and the (k+1)-th motor by referring to the translational force outputted from the driving force converter, for each integer k ranging from 1 to n, and wherein k+1 is 1 if k is n, to thereby complete acquisition of each of the operation states of each of the first motor to the n-th motor.

As one example, the driving force converter includes (1) each of a first pinion to an n-th pinion combined with each of driving shafts in each of the first motor to the n-th motor and (2) a rack with which each of the first pinion to the n-th pinion is engaged, and wherein, while the rack is stationary, the controller (i) transmits the first control signal to the k-th motor and the second control signal to the (k+1)-th motor, (ii) acquires a k-th rotation angle of the k-th motor and a (k+1)-th rotation angle of the (k+1)-th motor, and (iii) compares a preset threshold angle respectively with the k-th rotation angle and the (k+1)-th rotation angle, and thus acquires each of the operation states of each of the k-th motor and the (k+1)-th motor.

As one example, the controller (i) determines that the k-th motor and the (k+1)-th motor are normal if each of the k-th rotation angle and the (k+1)-th rotation angle is equal to or smaller than the preset threshold angle and (ii) determines that at least one of the k-th motor and the (k+1)-th motor is abnormal if at least one of the k-th rotation angle and the (k+1)-th rotation angle is greater than the preset threshold angle.

As one example, if the first motor to the n-th motor are determined as normal, the controller (i) performs, (i-1) while the k-th motor is rotated in the first rotational direction and the (k+1)-th motor is rotated in the second rotational direction, a k-th process of detecting a (k_1)-st rotation angle of the k-th motor and a $\{(k+1)\_1\}$-st rotation angle of the (k+1)-th motor and (i-2) while the k-th motor is rotated in the second rotational direction and the (k+1)-th motor is rotated in the first rotational direction, a (k+1)-th process of detecting a (k_2)-nd rotation angle of the k-th motor and a $\{(k+1)\_2\}$-nd rotation angle of the (k+1)-th motor and (ii) calibrates each of torque constants of each of the k-th motor and the (k+1)-th motor by referring to the (k_1)-st rotation angle, the $\{(k+1)\_1\}$-st rotation angle, the (k_2)-nd rotation angle, and the $\{(k+1)\_2\}$-nd rotation angle, for each integer k ranging from 1 to n, wherein k+1 is 1 if k is n, to thereby complete calibration of each of the torque constants of each of the first motor to the n-th motor.

As one example, the controller, (i) if the (k_1)-st rotation angle and the $\{(k+1)\_1\}$-st rotation angle are in the first rotational direction and if the (k_2)-nd rotation angle and the $\{(k+1)\_2\}$-nd rotation angle are in the second rotational direction, then calibrates a (k+1)-th torque constant of the (k+1)-th motor by referring to a k-th torque constant of the k-th motor, a difference between the (k_1)-st rotation angle and the $\{(k+1)\_1\}$-st rotation angle, a stiffness coefficient of the driving force converter, and each of driving currents fed into each of the k-th motor and the (k+1)-th motor and (ii)

if the (k_1)-st rotation angle and the {(k+1)_1}-st rotation angle are in the second rotational direction and if the (k_2)-nd rotation angle and the {(k+1)_2}-nd rotation angle are in the first rotational direction, then calibrates the k-th torque constant by referring to the (k+1)-th torque constant, a difference between the (k_2)-nd rotation angle and the {(k+1)_2}-nd rotation angle, the stiffness coefficient, and each of the driving currents.

As one example, each of the first pinion to the n-th pinion is directly engaged with the rack or indirectly engaged with the rack through at least one worm gear.

As one example, the brake pedal is pressed by movement of a first end of the motion shaft and wherein the rack is combined with a second end of the motion shaft or wherein the rack is combined with a joint of a first link and a second link included in the motion shaft wherein the brake pedal is pressed by movement of and the second link is combined with the robot body.

As one example, the rack includes a rack gear part and a rack shaft part wherein the rack shaft part is combined with a disk part and wherein the rack gear part is disposed on an outer circumferential side of the disk part or on an inner circumferential side of the disk part, wherein each of the first pinion to the n-th pinion is directly engaged with the rack gear part or indirectly engaged with the rack gear part through at least one worm gear.

As one example, a cylinder with a lengthwise cavity therein is combined with the motion shaft and wherein the brake pedal is pressed by a cylinder shaft engaged with the cylinder.

As one example, the controller detects driving information on the vehicle driven for the braking test, and if the driving information is detected as satisfying an initial condition of the braking test corresponding to the scenario, the controller drives the motors, to thereby allow the pedal effort corresponding to the scenario to be applied to the brake pedal.

As one example, the controller (i) allows the pedal effort to be applied to the brake pedal within a preset time period corresponding to the scenario and (ii) allows the pedal effort to be maintained or allows the pedal effort to be applied to the brake pedal repeatedly, by referring to the pedal effort detected from the load sensor.

In accordance with another aspect of the present disclosure, there is provided a method of a braking robot performing a braking test of a vehicle, including steps of: (a) the braking robot instructing a controller to perform a process of controlling a first motor to an n-th motor, to thereby convert rotational forces of the first motor to the n-th motor into a translational force and allow the translational force to be transmitted to a driving force converter which delivers the translational force to a motion shaft, wherein the motion shaft is combined with a pedal presser for applying the translational force as pedal effort to a brake pedal, wherein a sum of the individual output powers of the first motor to the n-th motor corresponds to the pedal effort predetermined for the braking test, and wherein n is an integer equal to or greater than 1; and (b) the braking robot instructing the controller to perform a process of transmitting a first control signal for instructing a k-th motor to rotate in a first rotational direction to the k-th motor and a second control signal for instructing a (k+1)-th motor to rotate in a second rotational direction to the (k+1)-th motor, and a process of acquiring each of operation states of the k-th motor and the (k+1)-th motor by referring to the translational force outputted from the driving force converter, for each integer k ranging from 1 to n, wherein k+1 is 1 if k is n, to thereby complete acquisition of each of the operation states of each of the first motor to the n-th motor.

As one example, the driving force converter includes (1) each of a first pinion to an n-th pinion combined with each of driving shafts in each of the first motor to the n-th motor and (2) a rack with which each of the first pinion to the n-th pinion is engaged, and wherein, while the rack is stationary, the controller (i) transmits the first control signal to the k-th motor and the second control signal to the (k+1)-th motor, (ii) acquires a k-th rotation angle of the k-th motor and a (k+1)-th rotation angle of the (k+1)-th motor, and (iii) compares a preset threshold angle respectively with the k-th rotation angle and the (k+1)-th rotation angle, and thus acquires each of the operation states of each of the k-th motor and the (k+1)-th motor.

As one example, the controller (i) determines that the k-th motor and the (k+1)-th motor are normal if each of the k-th rotation angle and the (k+1)-th rotation angle is equal to or smaller than the preset threshold angle and (ii) determines that at least one of the k-th motor and the (k+1)-th motor is abnormal if at least one of the k-th rotation angle and the (k+1)-th rotation angle is greater than the preset threshold angle.

As one example, if the first motor to the n-th motor are determined as normal, the controller (i) performs, (i-1) while the k-th motor is rotated in the first rotational direction and the (k+1)-th motor is rotated in the second rotational direction, a k-th process of detecting a (k_1)-st rotation angle of the k-th motor and a {(k+1)_1}-st rotation angle of the (k+1)-th motor and (i-2) while the k-th motor is rotated in the second rotational direction and the (k+1)-th motor is rotated in the first rotational direction, a (k+1)-th process of detecting a (k_2)-nd rotation angle of the k-th motor and a {(k+1)_2}-nd rotation angle of the (k+1)-th motor and (ii) calibrates each of torque constants of each of the k-th motor and the (k+1)-th motor by referring to the (k_1)-st rotation angle, the {(k+1)_1}-st rotation angle, the (k_2)-nd rotation angle, and the {(k+1)_2}-nd rotation angle, for each integer k ranging from 1 to n, wherein k+1 is 1 if k is n, to thereby complete calibration of each of the torque constants of each of the first motor to the n-th motor.

As one example, the controller, (i) if the (k_1)-st rotation angle and the {(k+1)_1}-st rotation angle are in the first rotational direction and if the (k_2)-nd rotation angle and the {(k+1)_2}-nd rotation angle are in the second rotational direction, then calibrates a (k+1)-th torque constant of the (k+1)-th motor by referring to a k-th torque constant of the k-th motor, a difference between the (k_1)-st rotation angle and the {(k+1)_1}-st rotation angle, a stiffness coefficient of the driving force converter, and each of driving currents fed into each of the k-th motor and the (k+1)-th motor and (ii) if the (k_1)-st rotation angle and the {(k+1)_1}-st rotation angle are in the second rotational direction and if the (k_2)-nd rotation angle and the {(k+1)_2}-nd rotation angle are in the first rotational direction, then calibrates the k-th torque constant by referring to the (k+1)-th torque constant, a difference between the (k_2)-nd rotation angle and the {(k+1)_2}-nd rotation angle, the stiffness coefficient, and each of the driving currents.

As one example, wherein the controller detects driving information on the vehicle driven for the braking test, and if the driving information is detected as satisfying an initial condition of the braking test corresponding to the scenario, the controller drives the motors, to thereby allow the pedal effort corresponding to the scenario to be applied to the brake pedal.

As one example, the controller (i) allows the pedal effort to be applied to the brake pedal within a preset time period corresponding to the scenario and (ii) allows the pedal effort to be maintained or allows the pedal effort to be applied to the brake pedal repeatedly, by referring to the pedal effort detected from the load sensor.

BRIEF DESCRIPTION OF THE DRAWINGS

The above and other objects and features of the present disclosure will become apparent from the following description of preferred embodiments given in conjunction with the accompanying drawings, in which:

FIGS. 2A and 2B are drawings schematically illustrating configurations of the braking robot in accordance with example embodiments of the present disclosure.

FIG. 6 is a flow chart schematically illustrating steps of the braking test performed by the braking robot in accordance with one example embodiment of the present disclosure.

DETAILED DESCRIPTION OF THE PREFERRED EMBODIMENTS

Figure 1:
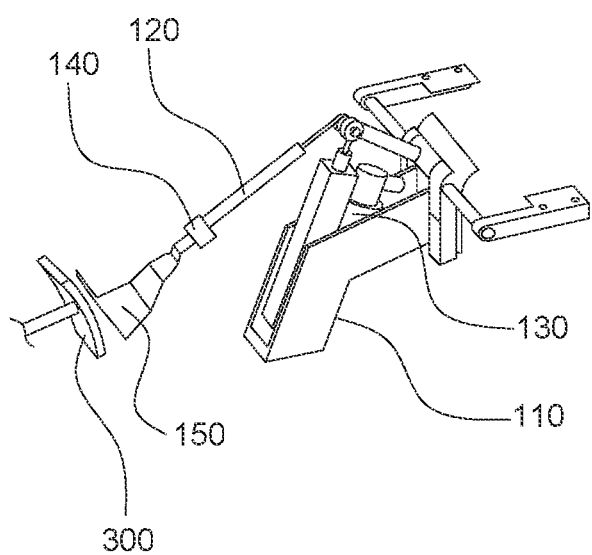
FIG. 1 is a drawing schematically illustrating a braking robot for a braking test of a vehicle in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained in detail by referring to attached diagrams as shown below.

FIG. 1 is a drawing schematically illustrating a braking robot 100 for a braking test of a vehicle in accordance with one example embodiment of the present disclosure.

By referring to FIG. 1, the braking robot 100 for the braking test may include a robot body 110, a motion shaft 120, an actuator 130, a load sensor 140, and a pedal presser 150 for applying pedal effort to a brake pedal 300 of the vehicle.

Herein, the robot body 110 may be fixed to a driver's seat of the vehicle, and may be installed on a specific location in the vehicle such that the robot body 110 does not interfere with operation of the vehicle by a test driver.

Figure 3A:
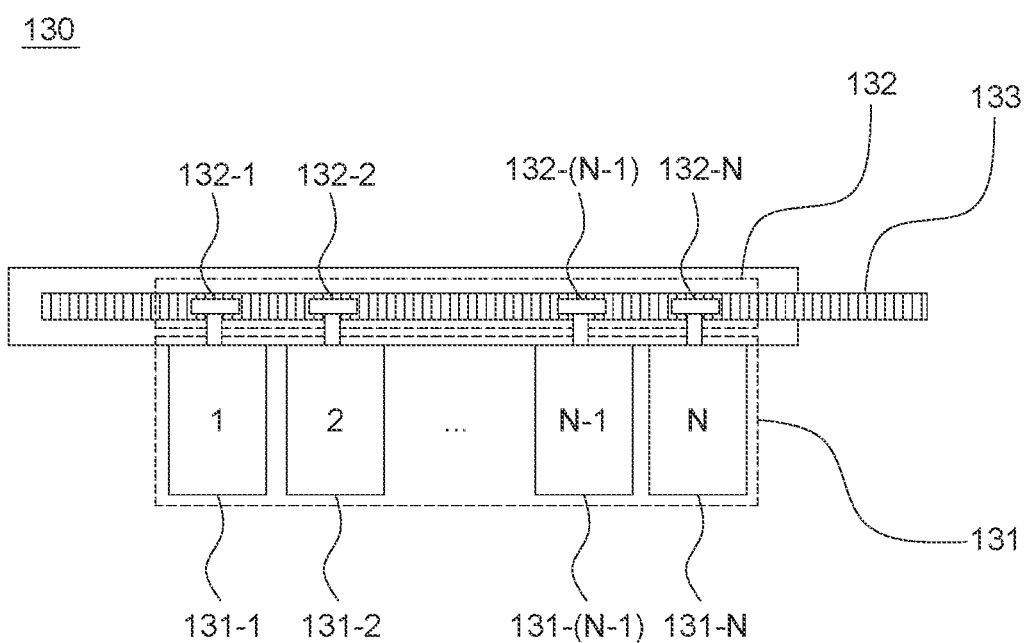
FIGS. 3A and 3B are drawings schematically illustrating processes of acquiring operation states of a first motor to an n-th motor of the braking robot in accordance with one example embodiment of the present disclosure.
Figure 3B:
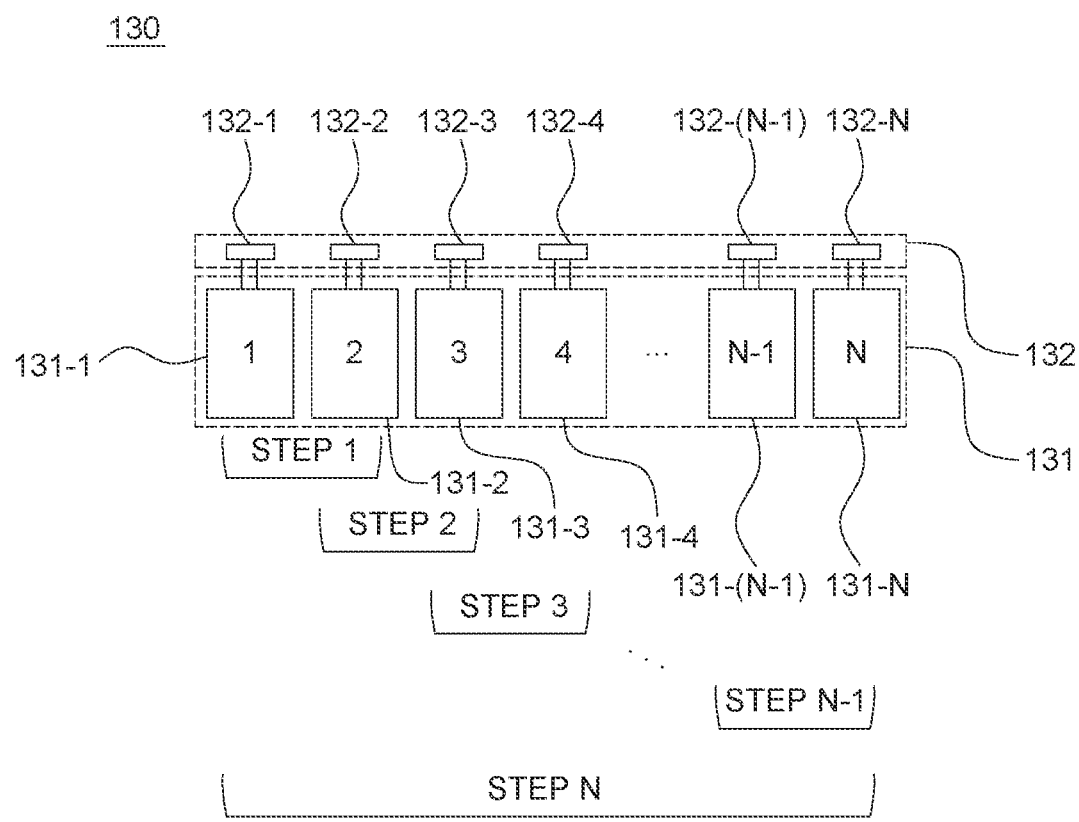

For reference, as shown in FIGS. 3A and 3B, the actuator 130 may include a plurality of motors 131 with same individual output powers and a driving force converter. Herein, the driving force converter may be comprised of a plurality of pinions 132 and a rack 133. The driving force converter may convert rotational forces of the motors 131, corresponding to the individual output powers of the motors 131, into a translational force and may transmit the translational force to the motion shaft 120 along a length of the motion shaft 120. Herein, the plurality of the motors 131 may be connected in parallel, that is, the motors 131 may be arranged such that driving shafts of the motors 131 are parallel to one another. Also, the rack 133 may serve as a rack shaft and may also serve as a rack gear with a linear or helical gear being formed on the rack 133, but the scope of the present disclosure is not limited thereto.

By referring to FIG. 1 again, the motion shaft 120 may be combined with the pedal presser 150. The motion shaft 120 may receive the translational force from the driving force converter and may transmit the translational force to the brake pedal 300 as the pedal effort through the pedal presser 150, to thereby allow braking of the vehicle.

Herein, in order to prevent the motion shaft 120 from breaking when the pedal effort is delivered to the brake pedal 300, the motion shaft 120 may be manufactured from robust material such as stainless steel, aluminum alloy, etc., but the scope of the present disclosure is not limited thereto.

Further, the braking robot 100 may include (i) the load sensor 140 for detecting the pedal effort applied to the brake pedal 300 by the motion shaft 120, in which the load sensor 140 is installed on the motion shaft 120 such that the load sensor 140 is positioned between the motion shaft 120 and the pedal presser 150 and (ii) a controller (not illustrated) for controlling operations of the motors 131 by referring to (1) a scenario for the braking test and (2) information on the pedal effort detected from the load sensor 140.

Figure 2B:
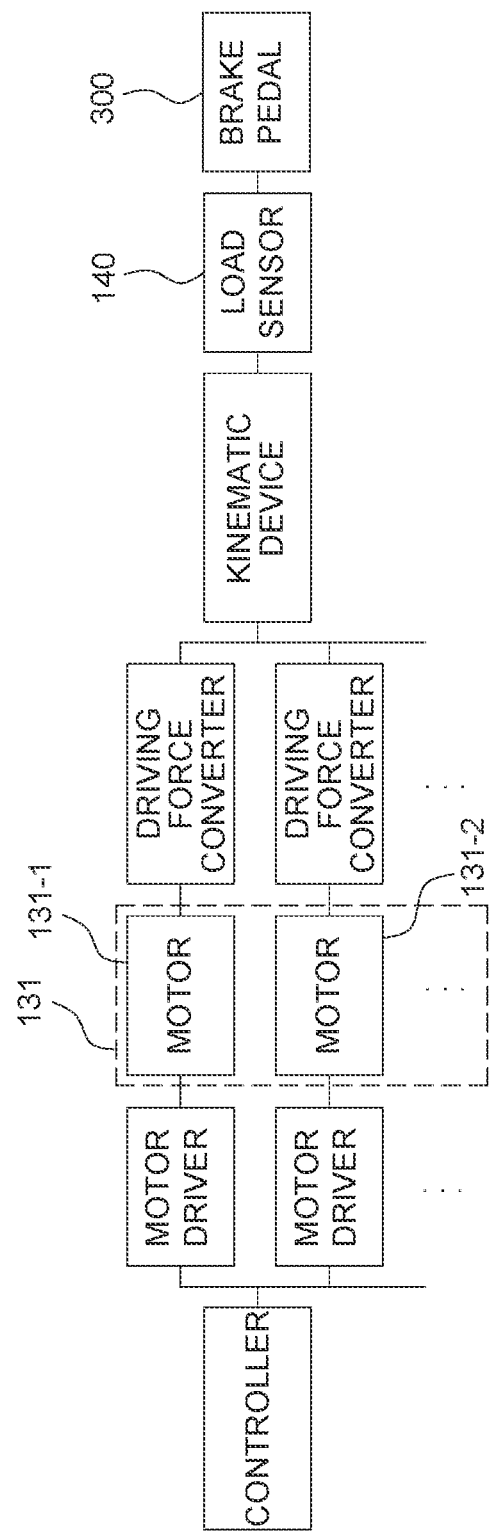

Next, configurations of the braking robot 100 are described by referring to FIGS. 2A and 2B.

FIGS. 2A and 2B are drawings schematically illustrating the configurations of the braking robot 100 in accordance with example embodiments of the present disclosure.

By referring to FIG. 2A, the controller may control motor drivers, each of which controls each of driving currents fed into each of the motors 131 with the same individual output powers, to thereby operate the motors 131.

And, each of the rotational forces generated by each of the motors 131 may be converted into a single translational force by the driving force converter, and the translational force from the driving force converter may be transmitted to the brake pedal 300, to thereby allow the braking of the vehicle.

Herein, the pedal effort applied to the brake pedal 300 may be detected by the load sensor 140.

By referring to FIG. 2B, the configuration of FIG. 2B is different from that of FIG. 2A in that each of the motors 131 is connected to each of driving force converters and that each of the driving force converters is connected to a single kinematic device. Therefore, instead of converting the rotational forces into the single translational force, according to the configuration of the braking robot 100 in FIG. 2B, each of the rotational forces may be converted into each of translational forces and the kinematic device may integrate each of the translational forces into the single translational force by transforming each of directions of each of the translational forces.

Next, processes of acquiring each of operation states of each of a first motor 131-1 to an n-th motor 131-n of the braking robot 100 are described by referring to FIGS. 3A and 3B. FIGS. 3A and 3B are drawings schematically illustrating the processes of acquiring each of the operation states of each of the first motor 131-1 to the n-th motor 131-n in accordance with one example embodiment of the present disclosure.

By referring to FIG. 3A, the motors 131 of the driving force converter may include the first motor 131-1 to the n-th motor 131-n. Herein, a sum of the individual output powers of the first motor 131-1 to the n-th motor 131-n may correspond to the pedal effort predetermined for the braking test. Herein, n may be an integer equal to or greater than 1. Also, the first motor 131-1 to the n-th motor 131-n may be connected in parallel.

And, before the braking test is performed, the controller may (i) transmit a first control signal for instructing a k-th motor to rotate in a first rotational direction to the k-th motor and a second control signal for instructing a (k+1)-th motor to rotate in a second rotational direction to the (k+1)-th motor, and (ii) acquire each of the operation states of the k-th motor and the (k+1)-th motor by referring to the translational force outputted from the driving force converter, for each integer k ranging from 1 to n, in which k+1 is 1 if k is n, to thereby complete acquisition of each of the operation states of each of the first motor 131-1 to the n-th motor 131-n.

That is, the controller may pair each of two adjacent motors among the first motor 131-1 to the n-th motor 131-n, to thereby acquire each of the operation states of each of the paired motors. Herein, as an exception, although the n-th motor 131-n and the first motor 131-1 are not adjacent to each other, the n-th motor 131-n and the first motor 131-1 may be paired for acquiring each of the operation states of the n-th motor 131-n and the first motor 131-1.

Herein, the driving force converter may include (1) each of a first pinion 132-1 to an n-th pinion 132-n, among the plurality of the pinions 132, combined with each of the driving shafts in each of the first motor 131-1 to the n-th motor 131-n and (2) the rack 133 with which each of the first pinion 132-1 to the n-th pinion 132-n is engaged.

Herein, while the rack 133 is stationary, the controller may (i) transmit the first control signal to the k-th motor and the second control signal to the (k+1)-th motor, (ii) acquire a k-th rotation angle of the k-th motor and a (k+1)-th rotation angle of the (k+1)-th motor, and (iii) compare a preset threshold angle respectively with the k-th rotation angle and the (k+1)-th rotation angle, and thus acquire each of the operation states of the k-th motor and the (k+1)-th motor.

Then, the controller may (i) determine that the k-th motor and the (k+1)-th motor are normal if each of the k-th rotation angle and the (k+1)-th rotation angle is equal to or smaller than the preset threshold angle and (ii) determine that at least one of the k-th motor and the (k+1)-th motor is abnormal if at least one of the k-th rotation angle and the (k+1)-th rotation angle is greater than the preset threshold angle.

For example, if k is 2, the first control signal may be inputted into the second motor 131-2 and the second control signal may be inputted into the third motor 131-3. Herein, a rotated angle of the second motor 131-2 may be the second rotation angle and a rotated angle of the third motor 131-3 may be the third rotation angle. Then, each of the second rotation angle and the third rotation angle may be compared with the preset threshold angle.

Herein, each of the first rotational angle to the n-th rotational angle of each of the first motor 131-1 to the n-th motor 131-n may be detected by each of encoders (not illustrated) installed on each of the first motor 131-1 to the n-th motor 131-n. In case that the second rotational angle is $\theta_2$, the third rotational angle is $\theta_3$ and the preset threshold angle is $\theta_{threshold}$, if each of $\theta_2$ and $\theta_3$ is detected as equal to or less than $\theta_{threshold}$, the second motor 131-2 and the third motor 131-3 may be determined as normal, and if at least one of $\theta_2$ and $\theta_3$ is detected as greater than $\theta_{threshold}$, at least one of the second motor 131-2 and the third motor 131-3 may be determined as abnormal.

Meanwhile, as can be seen in FIG. 3B, the processes above may be performed for every integer k ranging from 1 to n in which k+1 is 1 if k is n. Herein, if each of the first rotational angle to the n-th rotational angle is equal to or less than the preset threshold angle, then each of the first motor 131-1 to the n-th motor 131-n may be determined as normal.

After each of the first motor 131-1 to the n-th motor 131-n is determined as normal, the controller may calibrate each of torque constants of each of the first motor 131-1 to the n-th motor 131-n.

If the first motor 131-1 to the n-th motor 131-n are determined as normal, the controller may (i) perform, (i–1) while the k-th motor is rotated in the first rotational direction and the (k+1)-th motor is rotated in the second rotational direction, a k-th process of detecting a (k_1)-st rotation angle of the k-th motor and a {(k+1)_1}-st rotation angle of the (k+1)-th motor and (i–2) while the k-th motor is rotated in the second rotational direction and the (k+1)-th motor is rotated in the first rotational direction, a (k+1)-th process of detecting a (k_2)-nd rotation angle of the k-th motor and a {(k+1)_2}-nd rotation angle of the (k+1)-th motor and (ii) calibrate each of the torque constants of each of the k-th motor and the (k+1)-th motor by referring to the (k_1)-st rotation angle, the {(k+1)_1}-st rotation angle, the (k_2)-nd rotation angle, and the {(k+1)_2}-nd rotation angle, for each integer k ranging from 1 to n in which k+1 is 1 if k is n, to thereby complete calibration of each of the torque constants of each of the first motor 131-1 to the n-th motor 131-n.

Herein, the controller, (i) if the (k_1)-st rotation angle and the {(k+1)_1}-st rotation angle are in the first rotational direction and if the (k_2)-nd rotation angle and the {(k+1)_2}-nd rotation angle are in the second rotational direction, then may calibrate a (k+1)-th torque constant of the (k+1)-th motor by referring to a k-th torque constant of the k-th motor, a difference between the (k_1)-st rotation angle and the {(k+1)_1}-st rotation angle, a stiffness coefficient of the driving force converter, and each of driving currents fed into each of the k-th motor and the (k+1)-th motor and (ii) if the (k_1)-st rotation angle and the {(k+1)_1}-st rotation angle are in the second rotational direction and if the (k_2)-nd rotation angle and the {(k+1)_2}-nd rotation angle are in the first rotational direction, then may calibrate the k-th torque constant by referring to the (k+1)-th torque constant, a difference between the (k_2)-nd rotation angle and the {(k+1)_2}-nd rotation angle, the stiffness coefficient, and each of the driving currents.

The processes of calibrating each of the torque constants of each of the first motor 131-1 to the n-th motor 131-n as above are described by referring to equations below.

First, a net torque τ is represented by an equation below.

$$\tau = K\ddot{\theta} = l_k i_k + l_{k+1} i_{k+1}$$

Herein, $l_k$ is the k-th torque constant, $l_{k+1}$ is the (k+1)-th torque constant, K is the stiffness coefficient of the driving force converter, $\ddot{\theta}$ is a difference between a rotation angle of the k-th motor and a rotation angle of the (k+1)-th motor, $i_k$ is a driving current fed into the k-th motor, and $i_{k+1}$ is a driving current fed into the (k+1)-th motor.

Herein, $i_k$ and $i_{k+1}$ are equal in magnitude and opposite in direction, therefore, i may be assigned to $i_k$ and −i may be assigned to $i_{k+1}$.

First, if the (k_1)-st rotation angle and the {(k+1)_1}-st rotation angle are in the first rotational direction and if the (k_2)-nd rotation angle and the {(k+1)_2}-nd rotation angle are in the second rotational direction, then the (k+1)-th torque constant of the (k+1)-th motor may be calibrated as follows.

$$l_{k+1} = l_k - \frac{K}{i}\ddot{\theta}$$

Next, if the (k_1)-st rotation angle and the {(k+1)_1}-st rotation angle are in the second rotational direction and if the (k_2)-nd rotation angle and the {(k+1)_2}-nd rotation angle are in the first rotational direction, then the k-th torque constant of the k-th motor may be calibrated as follows.

$$l_k = l_{k+1} + \frac{K}{i}\ddot{\theta}$$

Next, exemplar structures of the driving force converter are described by referring to FIGS. 4A to 4D.

FIGS. 4A to 4D are drawings schematically illustrating the exemplar structures of the driving force converter of the braking robot 100 in accordance with example embodiments of the present disclosure.

Figure 4A:
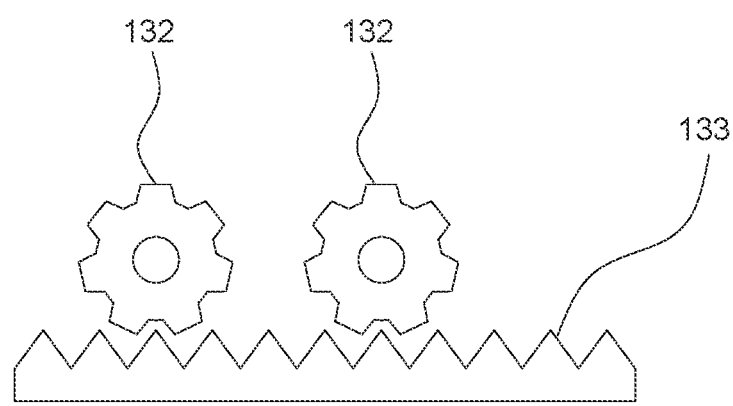
FIGS. 4A to 4D are drawings schematically illustrating structures of a driving force converter of the braking robot in accordance with example embodiments of the present disclosure.

As one example, by referring to FIG. 4A, the driving force converter may have a structure in which the plurality of the pinions 132 are engaged with the rack 133 through a linear gear part on the rack 133, but the scope of the present disclosure is not limited thereto.

Figure 4B:
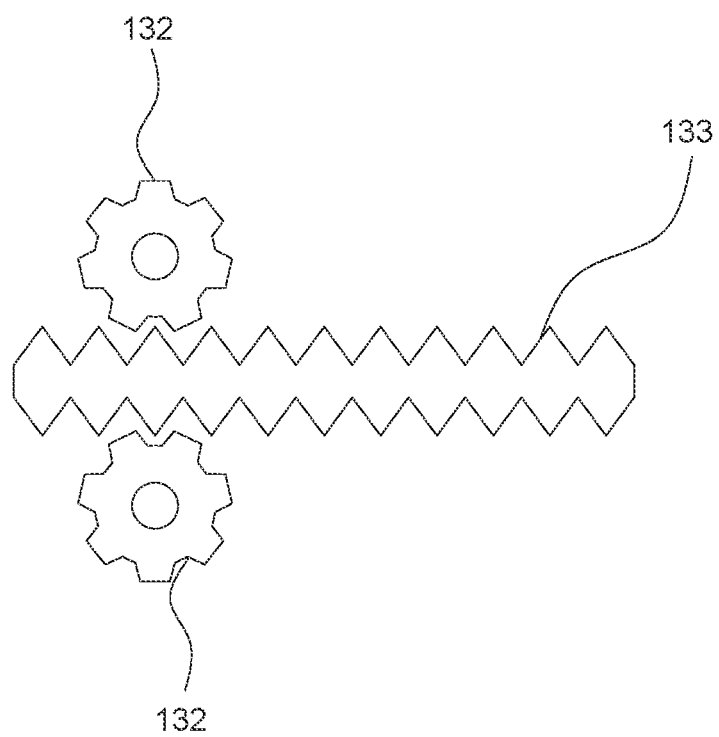

As another example, by referring to FIG. 4B, the driving force converter may have a structure in which the plurality of the pinions 132 are engaged with the rack 133 through a screw thread part on the rack 133, but the scope of the present disclosure is not limited thereto.

Figure 4C:
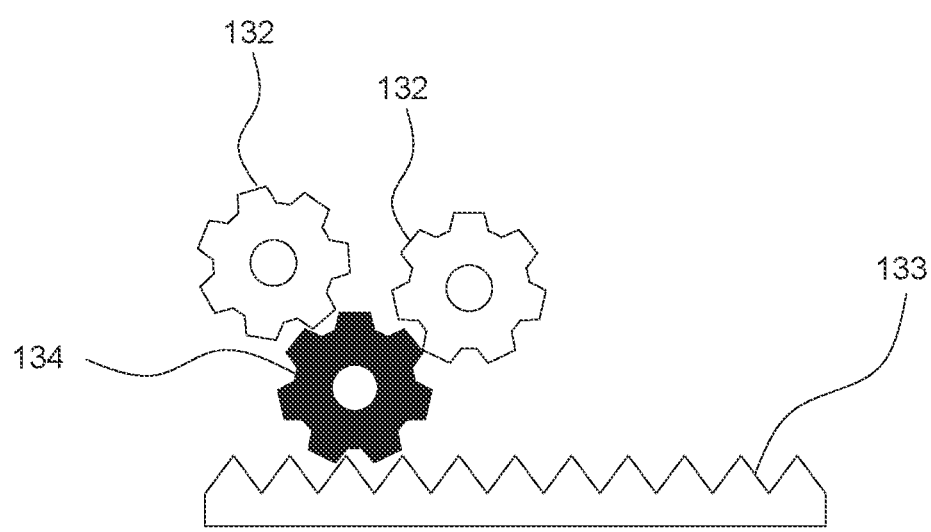

As still another example, by referring to FIG. 4C, the driving force converter may have a structure in which the plurality of the pinions 132 are engaged with the rack 133 through the worm gear 134, but the scope of the present disclosure is not limited thereto.

Figure 4D:
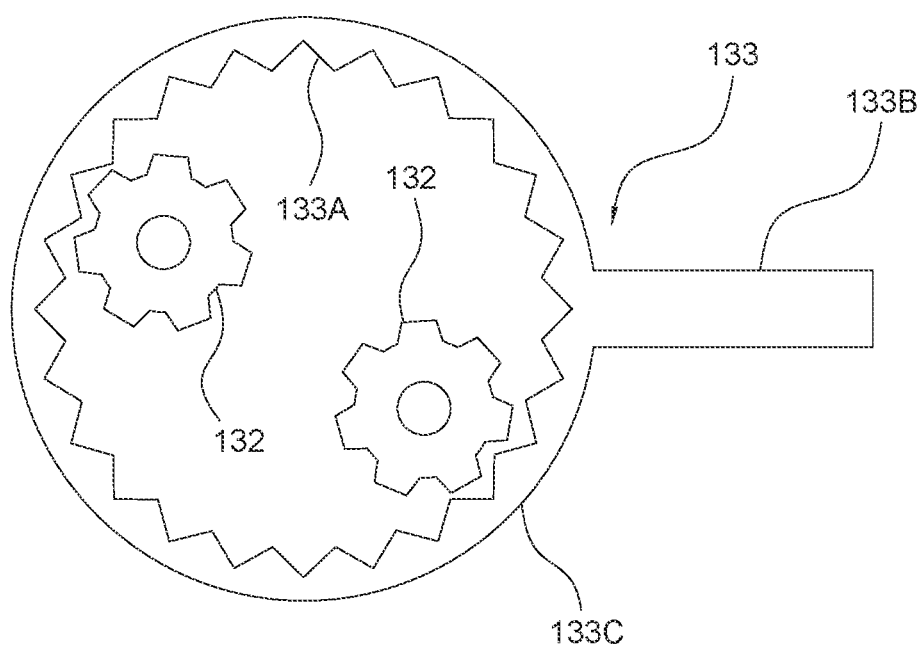

As still yet another example, by referring to FIG. 4D, the driving force converter may have a structure in which the rack 133 is comprised of a rack gear part 133A, a rack shaft part 133B, and a disk part 133C. That is, the rack gear part 133A, engaged with the plurality of the pinions 132, may be disposed on an inner circumferential side of the disk part 133C or the rack gear part 133A may be disposed on an outer circumferential side (not illustrated) of the disk part 133C. And the disk part 133C may be combined with the rack shaft part 133B. Herein, each of the plurality of the pinions 132 may be directly engaged with the rack gear part 133A or indirectly engaged with the rack gear part 133A through the worm gear (not illustrated). And the worm gear (not illustrated) may be engaged with the inner circumferential side or the outer circumferential side (not illustrated) of the disk part 133C. But the scope of the present disclosure is not limited thereto.

The exemplar structures of the driving force converter shown in FIGS. 4A to 4D are for illustrating purposes only, and various structures of the driving force converter not illustrated herein are allowed.

As the case may be, the structure of the driving force converter may be a structure in which the plurality of the pinions are engaged, through the worm gear 134, with the rack 133 having the screw thread part, the inner circumferential side of the disk part, or the outer circumferential side of the disk part.

Also, the brake pedal 300 may be pressed by movement of a first end of the motion shaft 120 and the rack 133 may be combined with a second end of the motion shaft 120. As another example, the rack 133 may be combined with a joint of a first link and a second link included in the motion shaft 120. Herein, the brake pedal 300 may be pressed by movement of the first link. Also, the second link may be combined with the robot body 110.

Figure 5:
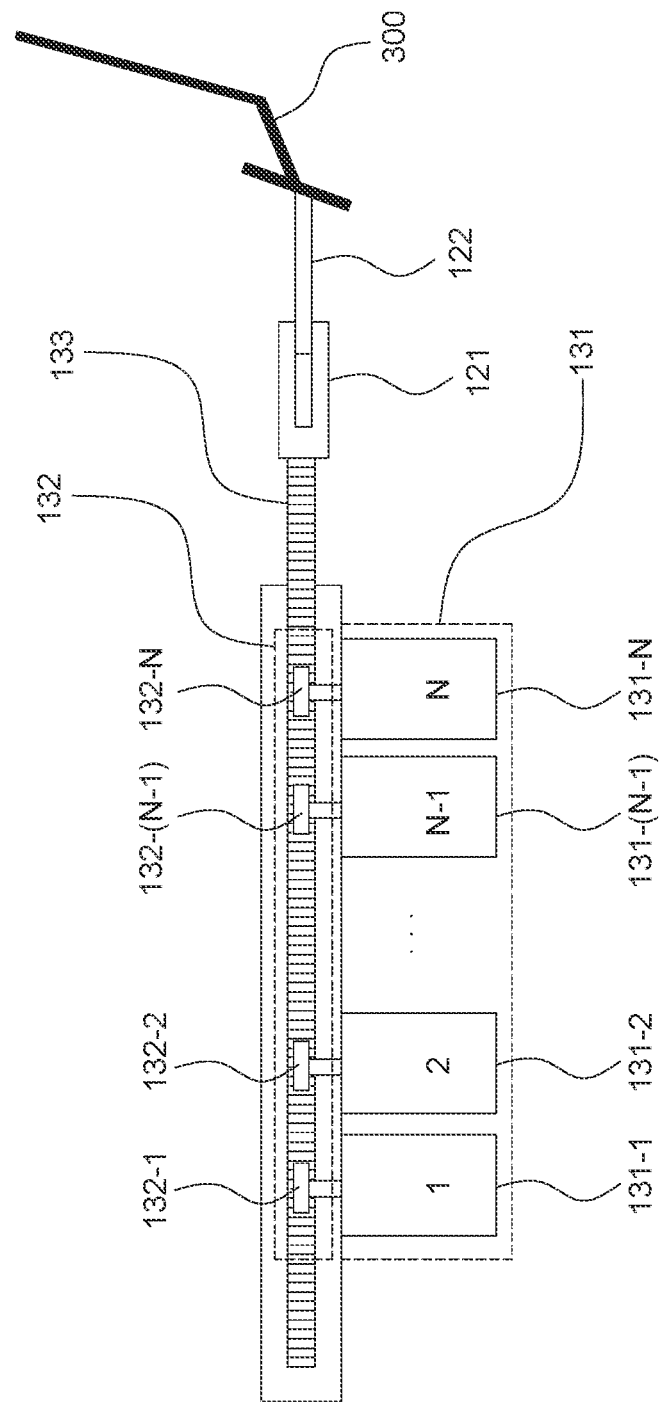
FIG. 5 is a drawing schematically illustrating a configuration of a motion shaft of the braking robot in accordance with another example embodiment of the present disclosure. Herein, the motion shaft is combined with a cylinder. And the cylinder is engaged with a cylinder shaft.

Next, by referring to FIG. 5, a configuration of the motion shaft 120 having a cylinder 121 and a cylinder shaft 122 is described. FIG. 5 is a drawing schematically illustrating the configuration of the motion shaft 120 of the braking robot 100. Herein, the motion shaft 120 has the cylinder 121 and the cylinder shaft 122 in accordance with another example embodiment of the present disclosure.

As one example, by referring to FIG. 5, the cylinder 121 with a lengthwise cavity therein and the cylinder shaft 122 may serve as the motion shaft 120, and the cylinder shaft 122 engaged with the cylinder 121 may press the brake pedal 300.

Herein, since the cylinder 121 and the cylinder shaft 122 are not fixedly combined relatively to each other, the cylinder 121 and the cylinder shaft 122 may be moved relatively in the opposite directions.

Therefore, if the rack 133 of the braking robot 100 is driven, the pedal effort may be transmitted to the cylinder shaft 122 and to the brake pedal 300 through the cylinder 121. Herein, the cylinder 121 may have at least one contact surface with at least one of the brake pedal 300 and the cylinder shaft 122.

Also, since the cylinder 121 and the cylinder shaft 122 may be moved relatively to each other, the test driver may apply the pedal effort to the brake pedal 300 directly without regard to the rack 133. Herein, the motion shaft 120 with which the cylinder 121 is combined does not move and only the brake pedal 300 is operated, thus the driver is able to drive the vehicle without regard to operation of the braking robot 100.

Next, by referring to FIG. 6, processes of performing the braking test by the braking robot 100 are described. FIG. 6 is a flow chart schematically illustrating steps of the braking test performed by the braking robot 100 in accordance with one example embodiment of the present disclosure.

The first motor 131-1 to the n-th motor 131-n may be combined with the driving force converter at a step of S601.

The braking robot 100 may instruct the controller to perform a process of controlling the first motor 131-1 to the n-th motor 131-n, to thereby convert each of the rotational forces of each of the first motor 131-1 to the n-th motor 131-$n$ into the translational force and allow the translational force to be transmitted to the driving force converter which delivers the translational force to the motion shaft 120. Herein, the motion shaft 120 may be combined with the pedal presser 150 for applying the pedal effort to the brake pedal 300, and the sum of the individual output powers of the first motor 131-1 to the n-th motor 131-$n$ corresponds to the pedal effort predetermined for the braking test. Also, n may be an integer equal to or greater than 1.

Next, each of the operation states of each of the first motor 131-1 to the n-th motor 131-$n$ may be acquired at a step of S602.

Herein, while the rack 133 is stationary, the braking robot 100 may instruct the controller to (i) transmit the first control signal to the k-th motor and the second control signal to the (k+1)-th motor, (ii) acquire a k-th rotation angle of the k-th motor and a (k+1)-th rotation angle of the (k+1)-th motor, and (iii) compare a preset threshold angle respectively with the k-th rotation angle and the (k+1)-th rotation angle, and thus acquire each of the operation states of each of the k-th motor and the (k+1)-th motor.

Then, the controller may (i) determine that the k-th motor and the (k+1)-th motor are normal if each of the k-th rotation angle and the (k+1)-th rotation angle is equal to or smaller than the preset threshold angle and (ii) determine that at least one of the k-th motor and the (k+1)-th motor is abnormal if at least one of the k-th rotation angle and the (k+1)-th rotation angle is greater than the preset threshold angle.

For example, if k is 2, the first control signal may be inputted into the second motor 131-2 and the second control signal may be inputted into the third motor 131-3. Herein, a rotated angle of the second motor 131-2 may be the second rotation angle and a rotated angle of the third motor 131-3 may be the third rotation angle. Then, each of the second rotation angle and the third rotation angle may be compared with the preset threshold angle. Herein, each of the first rotational angle to the n-th rotational angle of each of the first motor 131-1 to the n-th motor 131-$n$ may be detected by each of the encoders (not illustrated) installed on each of the first motor 131-1 to the n-th motor 131-$n$. In case that the second rotational angle is $\theta_2$, the third rotational angle is $\theta_3$ and the preset threshold angle is $\theta_{threshold}$, if each of $\theta_2$ and $\theta_3$ is detected as equal to or less than $\theta_{threshold}$, the second motor 131-2 and the third motor 131-3 may be determined as normal, and if at least one of $\theta_2$ and $\theta_3$ is detected as greater than $\theta_{threshold}$, at least one of the second motor 131-2 and the third motor 131-3 may be determined as abnormal.

Meanwhile, as can be seen in FIG. 3B, the processes above may be performed for every integer k ranging from 1 to n where k+1 is 1 if k is n. Herein, if each of the first rotational angle to the n-th rotational angle is equal to or less than the preset threshold angle, each of the first motor 131-1 to the n-th motor 131-$n$ may be determined as normal.

Next, the controller may calibrate each of the torque constants of each of the first motor 131-1 to the n-th motor 131-$n$ at a step of S603.

If the first motor 131-1 to the n-th motor 131-$n$ are determined as normal, the controller may (i) perform, (i-1) while the k-th motor is rotated in the first rotational direction and the (k+1)-th motor is rotated in the second rotational direction, a k-th process of detecting a (k_1)-st rotation angle of the k-th motor and a {(k+1)_1}-st rotation angle of the (k+1)-th motor and (i-2) while the k-th motor is rotated in the second rotational direction and the (k+1)-th motor is rotated in the first rotational direction, a (k+1)-th process of detecting a (k_2)-nd rotation angle of the k-th motor and a {(k+1)_2}-nd rotation angle of the (k+1)-th motor and (ii) calibrate each of the torque constants of each of the k-th motor and the (k+1)-th motor by referring to the (k_1)-st rotation angle, the {(k+1)_1}-st rotation angle, the (k_2)-nd rotation angle, and the {(k+1)_2}-nd rotation angle, for each integer k ranging from 1 to n in which k+1 is 1 if k is n, to thereby complete calibration of each of the torque constants of each of the first motor 131-1 to the n-th motor 131-$n$.

Herein, the controller, (i) if the (k_1)-st rotation angle and the {(k+1)_1}-st rotation angle are in the first rotational direction and if the (k_2)-nd rotation angle and the {(k+1)_2}-nd rotation angle are in the second rotational direction, then may calibrate the (k+1)-th torque constant of the (k+1)-th motor by referring to the k-th torque constant of the k-th motor, a difference between the (k_1)-st rotation angle and the {(k+1)_1}-st rotation angle, the stiffness coefficient of the driving force converter, and each of the driving currents fed into each of the k-th motor and the (k+1)-th motor and (ii) if the (k_1)-st rotation angle and the {(k+1)_1}-st rotation angle are in the second rotational direction and if the (k_2)-nd rotation angle and the {(k+1)_2}-nd rotation angle are in the first rotational direction, then may calibrate the k-th torque constant by referring to the (k+1)-th torque constant, a difference between the (k_2)-nd rotation angle and the {(k+1)_2}-nd rotation angle, the stiffness coefficient, and each of the driving currents.

Processes of calibrating each of the torque constants of each of the first motor 131-1 to the n-th motor 131-$n$ as above are described by referring to equations below.

First, the net torque r is represented by an equation below.

$$\tau = K\ddot{\theta} = l_k i_k + l_{k+1} i_{k+1}$$

Herein, $l_k$ is the k-th torque constant, $l_{k+1}$ is the (k+1)-th torque constant, K is the stiffness coefficient of the driving force converter, $\ddot{\theta}$ is a difference between a rotation angle of the k-th motor and a rotation angle of the (k+1)-th motor, $i_k$ is a driving current fed into the k-th motor, and $i_{k+1}$ is a driving current fed into the (k+1)-th motor.

Herein, $i_k$ and $i_{k+1}$ are equal in magnitude and opposite in direction, therefore, i may be assigned to $i_k$ and $-i$ may be assigned to $i_{k+1}$.

First, if the (k_1)-st rotation angle and the {(k+1)_1}-st rotation angle are in the first rotational direction and if the (k_2)-nd rotation angle and the {(k+1)_2}-nd rotation angle are in the second rotational direction, then the (k+1)-th torque constant of the (k+1)-th motor may be calibrated as follows.

$$l_{k+1} = l_k - \frac{K}{i}\theta$$

Next, if the (k_1)-st rotation angle and the {(k+1)_1}-st rotation angle are in the second rotational direction and if the (k_2)-nd rotation angle and the {(k+1)_2}-nd rotation angle are in the first rotational direction, then the k-th torque constant of the k-th motor may be calibrated as follows.

$$l_k = l_{k+1} + \frac{K}{i}\theta$$

After the processes of calibrating each of the torque constants of each of the first motor 131-1 to the n-th motor 131-n are performed, the scenario for the braking test is selected and the vehicle is started, at a step of S604. Examples of the scenario are shown in a Table 1 below.

TABLE 1

| No. | Requirement for pedal effort | Speed change at braking | Gear speed |
|---|---|---|---|
| 1 | Reaching more than 670N within 0.2 seconds Maintaining more than pedal effort until stop | 96 → 0 KPH | N-th |
| 2 | Reaching 100 kgf within 0.2 seconds Maintaining pedal effort until stop | 105 → 0 KPH | N-th |
| 3 | Reaching 100 kgf within 0.2 seconds Maintaining pedal effort until stop | 137 → 0 KPH | N-th |

Herein, the controller may detect driving information on the vehicle, at a step of S605. If the driving information is detected as satisfying an initial condition of the braking test corresponding to the scenario at a step of S606, the controller may drive the motors, to thereby allow the pedal effort corresponding to the scenario to be applied to the brake pedal 300 at a step of S607.

The controller may (i) allow the pedal effort to be applied to the brake pedal 300 within a preset time period corresponding to the scenario and (ii) allow the pedal effort to be maintained or allow the pedal effort to be applied to the brake pedal 300 repeatedly, by referring to information on the pedal effort detected from the load sensor 140.

For example, in case that the scenario No. 1 is selected from the Table 1, if the controller detects the driving information representing that the speed of the vehicle is 96 KPH and the gear speed of the vehicle is at the N-th speed, then the controller may determine that the initial condition corresponding to the scenario No. 1 is satisfied, may allow the pedal effort of more than 670 N to be applied to the brake pedal 300 within 0.2 seconds, and may allow the pedal effort of more than 670 N to be maintained until the speed represented in the driving information becomes 0 KPH.

The examples of the initial condition and the requirement for the pedal effort are not limited to the examples shown in the Table 1, and various conditions such as temperature at braking, number of evaluations, etc. may be added to the initial condition, and also, various conditions such as changes of the pedal effort over time, etc. may be added to the requirement for the pedal effort.

The present disclosure has an effect of allowing generation of various outputs by connecting a plurality of the single-output motors in parallel.

The present disclosure has another effect of acquiring the operation states of the motors while the braking robot 100 is stationary.

The present disclosure has still another effect of providing the braking robot which satisfies the condition corresponding to the scenario for the braking test.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A braking robot for a braking test of a vehicle, comprising:
   a plurality of motors, having same individual output powers, combined with a robot body installed in the vehicle;
   a motion shaft combined with a pedal presser for applying pedal effort to a brake pedal of the vehicle;
   a driving force converter which converts rotational forces of the motors, corresponding to the individual output powers of the motors, into a translational force and thus transmits the translational force to the motion shaft;
   a load sensor, installed on the motion shaft, for detecting the pedal effort applied to the brake pedal by the motion shaft; and
   a controller for controlling operations of the motors based on (1) one or more scenarios for the braking test and (2) information on the pedal effort detected from the load sensor;
   wherein the motors include the motors include a first motor to an n-th motor;
   wherein a sum of the individual output powers of the first motor to the n-th motor corresponds to a specific pedal effort which is set for the braking test;
   wherein n is an integer equal to or greater than 1; and
   wherein, before the braking test is performed, the controller (i) transmits a first control signal to a k-th motor, wherein the first control signal instructs the k-th motor to rotate in a first rotational direction and transmits a second control signal to a (k+1)-th motor, wherein the second control signal instructs the (k+1)-th motor to rotate in a second rotational direction and (ii) acquires each of operation states of each of the k-th motor and the (k+1)-th motor by referring to the translational force outputted from the driving force converter, for each integer k ranging from 1 to n, and wherein k+1 is 1 if k is n, to thereby complete acquisition of each of the operation states of each of the first motor to the n-th motor.

2. The braking robot of claim 1, wherein a cylinder with a lengthwise cavity therein is combined with the motion shaft and wherein the brake pedal is pressed by a cylinder shaft engaged with the cylinder.

3. The braking robot of claim 1, wherein the driving force converter includes (1) each of a first pinion to an n-th pinion combined with each of driving shafts in each of the first motor to the n-th motor and (2) a rack with which each of the first pinion to the n-th pinion is engaged, and
   wherein, while the rack is stationary, the controller (i) transmits the first control signal to the k-th motor and the second control signal to the (k+1)-th motor, (ii) acquires a k-th rotation angle of the k-th motor and a (k+1)-th rotation angle of the (k+1)-th motor, and (iii) compares a preset threshold angle respectively with the k-th rotation angle and the (k+1)-th rotation angle, and thus acquires each of the operation states of each of the k-th motor and the (k+1)-th motor.

4. The braking robot of claim 3, wherein the controller (i) determines that the k-th motor and the (k+1)-th motor are normal if each of the k-th rotation angle and the (k+1)-th rotation angle is equal to or smaller than the preset threshold angle and (ii) determines that at least one of the k-th motor and the (k+1)-th motor is abnormal if at least one of the k-th rotation angle and the (k+1)-th rotation angle is greater than the preset threshold angle.

5. The braking robot of claim 3, wherein the rack includes a rack gear part and a rack shaft part wherein the rack shaft part is combined with a disk part and wherein the rack gear part is disposed on an outer circumferential side of the disk part or on an inner circumferential side of the disk part, and
wherein each of the first pinion to the n-th pinion is directly engaged with the rack gear part or indirectly engaged with the rack gear part through at least one worm gear.

6. The braking robot of claim 3, wherein, if the first motor to the n-th motor are determined as normal, the controller (i) performs, (i–1) while the k-th motor is rotated in the first rotational direction and the (k+1)-th motor is rotated in the second rotational direction, a k-th process of detecting a (k_1)-st rotation angle of the k-th motor and a {(k+1)_1}-st rotation angle of the (k+1)-th motor and (i–2) while the k-th motor is rotated in the second rotational direction and the (k+1)-th motor is rotated in the first rotational direction, a (k+1)-th process of detecting a (k_2)-nd rotation angle of the k-th motor and a {(k+1)_2}-nd rotation angle of the (k+1)-th motor and (ii) calibrates each of torque constants of each of the k-th motor and the (k+1)-th motor by referring to the (k_1)-st rotation angle, the {(k+1)_1}-st rotation angle, the (k_2)-nd rotation angle, and the {(k+1)_2}-nd rotation angle, for each integer k ranging from 1 to n, wherein k+1 is 1 if k is n, to thereby complete calibration of each of the torque constants of each of the first motor to the n-th motor.

7. The braking robot of claim 6, wherein the controller, (i) if the (k_1)-st rotation angle and the {(k+1)_1}-st rotation angle are in the first rotational direction and if the (k_2)-nd rotation angle and the {(k+1)_2}-nd rotation angle are in the second rotational direction, then calibrates a (k+1)-th torque constant of the (k+1)-th motor by referring to a k-th torque constant of the k-th motor, a difference between the (k_1)-st rotation angle and the {(k+1)_1}-st rotation angle, a stiffness coefficient of the driving force converter, and each of driving currents fed into each of the k-th motor and the (k+1)-th motor and (ii) if the (k_1)-st rotation angle and the {(k+1)_1}-st rotation angle are in the second rotational direction and if the (k_2)-nd rotation angle and the {(k+1)_2}-nd rotation angle are in the first rotational direction, then calibrates the k-th torque constant by referring to the (k+1)-th torque constant, a difference between the (k_2)-nd rotation angle and the {(k+1)_2}-nd rotation angle, the stiffness coefficient, and each of the driving currents.

8. The braking robot of claim 3, wherein each of the first pinion to the n-th pinion is directly engaged with the rack or indirectly engaged with the rack through at least one worm gear.

9. The braking robot of claim 8, wherein the brake pedal is pressed by movement of a first end of the motion shaft and wherein the rack is combined with a second end of the motion shaft or
wherein the rack is combined with a joint of a first link and a second link included in the motion shaft wherein the brake pedal is pressed by movement of the first link and the second link is combined with the robot body.

10. A braking robot for a braking test of a vehicle, comprising:
a plurality of motors, having same individual output powers, combined with a robot body installed in the vehicle;
a motion shaft combined with a pedal presser for applying pedal effort to a brake pedal of the vehicle;
a driving force converter which converts rotational forces of the motors, corresponding to the individual output powers of the motors, into a translational force and thus transmits the translational force to the motion shaft;
a load sensor, installed on the motion shaft, for detecting the pedal effort applied to the brake pedal by the motion shaft; and
a controller for controlling operations of the motors based on (1) one or more scenarios for the braking test and (2) information on the pedal effort detected from the load sensor;
wherein the controller detects driving information on the vehicle driven for the braking test, and if the driving information is detected as satisfying an initial condition of the braking test corresponding to the scenario, the controller drives the motors, to thereby allow the pedal effort corresponding to the scenario to be applied to the brake pedal.

11. The braking robot of claim 10, wherein the controller (i) allows the pedal effort to be applied to the brake pedal within a preset time period corresponding to the scenario and (ii) allows the pedal effort to be maintained or allows the pedal effort to be applied to the brake pedal repeatedly, by referring to the pedal effort detected from the load sensor.

12. A method of a braking robot performing a braking test of a vehicle, comprising steps of:
(a) the braking robot instructing a controller to perform a process of controlling a first motor to an n-th motor, to thereby convert rotational forces of the first motor to the n-th motor into a translational force and allow the translational force to be transmitted to a driving force converter which delivers the translational force to a motion shaft, wherein the motion shaft is combined with a pedal presser for applying the translational force as pedal effort to a brake pedal, wherein a sum of the individual output powers of the first motor to the n-th motor corresponds to the pedal effort predetermined for the braking test, and wherein n is an integer equal to or greater than 1; and
(b) the braking robot instructing the controller to perform a process of transmitting a first control signal to a k-th motor, wherein the first control signal instructs the k-th motor to rotate in a first rotational direction and transmitting a second control signal to a (k+1)-th motor, wherein the second control signal instructs the (k+1)-th motor to rotate in a second rotational direction, and a process of acquiring each of operation states of the k-th motor and the (k+1)-th motor by referring to the translational force outputted from the driving force converter, for each integer k ranging from 1 to n, wherein k+1 is 1 if k is n, to thereby complete acquisition of each of the operation states of each of the first motor to the n-th motor.

13. The method of claim 12, wherein the driving force converter includes (1) each of a first pinion to an n-th pinion combined with each of driving shafts in each of the first motor to the n-th motor and (2) a rack with which each of the first pinion to the n-th pinion is engaged, and
wherein, while the rack is stationary, the controller (i) transmits the first control signal to the k-th motor and the second control signal to the (k+1)-th motor, (ii) acquires a k-th rotation angle of the k-th motor and a (k+1)-th rotation angle of the (k+1)-th motor, and (iii) compares a preset threshold angle respectively with the k-th rotation angle and the (k+1)-th rotation angle, and thus acquires each of the operation states of each of the k-th motor and the (k+1)-th motor.

14. The method of claim 13, wherein the controller (i) determines that the k-th motor and the (k+1)-th motor are normal if each of the k-th rotation angle and the (k+1)-th rotation angle is equal to or smaller than the preset threshold angle and (ii) determines that at least one of the k-th motor and the (k+1)-th motor is abnormal if at least one of the k-th rotation angle and the (k+1)-th rotation angle is greater than the preset threshold angle.

15. The method of claim 13, wherein, if the first motor to the n-th motor are determined as normal, the controller (i) performs, (i–1) while the k-th motor is rotated in the first rotational direction and the (k+1)-th motor is rotated in the second rotational direction, a k-th process of detecting a (k_1)-st rotation angle of the k-th motor and a {(k+1)_1}-st rotation angle of the (k+1)-th motor and (i–2) while the k-th motor is rotated in the second rotational direction and the (k+1)-th motor is rotated in the first rotational direction, a (k+1)-th process of detecting a (k_2)-nd rotation angle of the k-th motor and a {(k+1)_2}-nd rotation angle of the (k+1)-th motor and (ii) calibrates each of torque constants of each of the k-th motor and the (k+1)-th motor by referring to the (k_1)-st rotation angle, the {(k+1)_1}-st rotation angle, the (k_2)-nd rotation angle, and the {(k+1)_2}-nd rotation angle, for each integer k ranging from 1 to n, wherein k+1 is 1 if k is n, to thereby complete calibration of each of the torque constants of each of the first motor to the n-th motor.

16. The method of claim 15, wherein the controller, (i) if the (k_1)-st rotation angle and the {(k+1)_1}-st rotation angle are in the first rotational direction and if the (k_2)-nd rotation angle and the {(k+1)_2}-nd rotation angle are in the second rotational direction, then calibrates a (k+1)-th torque constant of the (k+1)-th motor by referring to a k-th torque constant of the k-th motor, a difference between the (k_1)-st rotation angle and the {(k+1)_1}-st rotation angle, a stiffness coefficient of the driving force converter, and each of driving currents fed into each of the k-th motor and the (k+1)-th motor and (ii) if the (k_1)-st rotation angle and the {(k+1)_1}-st rotation angle are in the second rotational direction and if the (k_2)-nd rotation angle and the {(k+1)_2}-nd rotation angle are in the first rotational direction, then calibrates the k-th torque constant by referring to the (k+1)-th torque constant, a difference between the (k_2)-nd rotation angle and the {(k+1)_2}-nd rotation angle, the stiffness coefficient, and each of the driving currents.

17. The method of claim 12, wherein the controller detects driving information on the vehicle driven for the braking test, and if the driving information is detected as satisfying an initial condition of the braking test corresponding to a scenario, the controller drives the motors, to thereby allow the pedal effort corresponding to the scenario to be applied to the brake pedal.

18. The method of claim 17, wherein the controller (i) allows the pedal effort to be applied to the brake pedal within a preset time period corresponding to the scenario and (ii) allows the pedal effort to be maintained or allows the pedal effort to be applied to the brake pedal repeatedly, by referring to the pedal effort detected from a load sensor.

\* \* \* \* \*

UNITED STATES PATENT AND TRADEMARK OFFICE
CERTIFICATE OF CORRECTION

PATENT NO. : 11,435,247 B2  
APPLICATION NO. : 17/104110  
DATED : September 6, 2022  
INVENTOR(S) : Hyun Ho Kim and Ji Hyeong Han Page 1 of 1

It is certified that error appears in the above-identified patent and that said Letters Patent is hereby corrected as shown below:

On the Title Page

In Item (30) add Foreign Application Priority Data:
October 13, 2020 (KR) 1020200132271

Signed and Sealed this
Twenty-eighth Day of January, 2025

Coke Morgan Stewart
*Acting Director of the United States Patent and Trademark Office*